United States Patent
Song et al.

(10) Patent No.: US 6,822,723 B2
(45) Date of Patent: Nov. 23, 2004

(54) LIQUID CRYSTAL DISPLAY WITH A WIDE VIEWING ANGLE

(75) Inventors: Jang-Kun Song, Seoul (KR); Jae-Hoon Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 295 days.

(21) Appl. No.: 09/887,111

(22) Filed: Jun. 25, 2001

(65) Prior Publication Data

US 2002/0012087 A1 Jan. 31, 2002

(30) Foreign Application Priority Data

Jul. 27, 2000 (KR) ........................................ 2000-43504

(51) Int. Cl.[7] ............................................. G02F 1/133
(52) U.S. Cl. ...................... 349/178; 349/106; 349/183
(58) Field of Search ................................ 349/178, 143, 349/108, 128, 106, 183

(56) References Cited

U.S. PATENT DOCUMENTS

| | | | | |
|---|---|---|---|---|
| 4,469,408 A | * | 9/1984 | Kruger et al. | 349/127 |
| 5,221,978 A | * | 6/1993 | Heynderickx et al. | 349/76 |
| 6,084,650 A | * | 7/2000 | Sekiguchi | 349/106 |
| 6,215,536 B1 | | 4/2001 | Ebihara et al. | 349/86 |
| 6,222,605 B1 | | 4/2001 | Tillin et al. | |
| 6,429,914 B1 | * | 8/2002 | Kubota et al. | 349/86 |
| 6,452,651 B1 | * | 9/2002 | Takami et al. | 349/88 |
| 6,466,296 B1 | | 10/2002 | Yamada et al. | 349/160 |
| 6,515,727 B2 | * | 2/2003 | Yoon et al. | 349/143 |
| 2001/0007487 A1 | * | 7/2001 | Yoon et al. | 349/106 |
| 2001/0026339 A1 | * | 10/2001 | Choi et al. | 349/123 |
| 2001/0033353 A1 | | 10/2001 | Shimoshikiryo | 349/129 |

FOREIGN PATENT DOCUMENTS

| | | |
|---|---|---|
| JP | 8-254716 | 10/1996 |
| JP | 10-197860 | 7/1998 |
| JP | 11-30773 | 2/1999 |
| JP | 11-119206 | 4/1999 |
| JP | 11-352490 | 12/1999 |
| JP | 2000-347175 | * 12/2000 |
| JP | 2001-272665 | 10/2001 |
| KR | 2001106994 | * 1/2002 |

* cited by examiner

*Primary Examiner*—Nathan J. Flynn
*Assistant Examiner*—Ahmed N. Sefer
(74) *Attorney, Agent, or Firm*—McGuireWoods LLP

(57) ABSTRACT

A liquid crystal display includes a bottom substrate with thin film transistors and pixel electrodes, and a top substrate with a black matrix and color filters. Each pixel electrode has an opening pattern, and each color filter has a groove corresponding to the opening pattern. A common electrode is formed on the black matrix and the color filters, and vertical alignment layers are formed on the common electrode and the pixel electrodes, respectively. A liquid crystal layer bearing negative dielectric anisotropy is interposed between the substrates. The liquid crystal layer contains monomers, and a polymer is formed at the liquid crystal layer between the opening pattern of the pixel electrode and the groove of the color filter.

20 Claims, 4 Drawing Sheets

LIQUID CRYSTAL DISPLAY WITH A WIDE VIEWING ANGLE

BACKGROUND OF THE INVENTION (a) Field of the Invention

The present invention relates to a liquid crystal display and, more particularly, to a liquid crystal display with a wide viewing angle.

(b) Description of the Related Art

Generally, liquid crystal displays have a structure where a liquid crystal layer is sandwiched between two substrates, and an electric field is applied to the liquid crystal to control light transmission. Among the substrates, the top substrate is provided with a common electrode and color filters, and the bottom substrate with thin film transistors and pixel electrodes.

In VA-type (vertically aligned) liquid crystal displays, the liquid crystal molecules are aligned normal to the substrates when an electric field is not applied. In case two polarizer films are arranged perpendicular to each other, the linearly polarized light that has passed through the first polarizer film is completely blocked by the second polarizer film in the absence of an electric field. That is, since such a liquid crystal display exhibits a very low brightness at an "off" state in the normally black mode, it can obtain a relatively higher contrast ratio than the conventional TN liquid crystal displays.

However, when gray scale voltage is applied, the VA-type liquid crystal display involves a narrow viewing angle because of significant difference in retardation of the light depending on the viewing directions.

In order to solve such a problem, it has been proposed that an opening pattern should be formed at the electrode portion. When voltage is applied to the electrode with such an opening pattern, a bent electric field is generated at an area close to the opening pattern, called "fringe field." The fringe field makes it possible to arrange the liquid crystal molecules in an appropriate manner, thereby widening the viewing angle.

However, in this case, a photolithography process is necessary to form an opening pattern at the common electrode on the color filters. This may damage the underlying color filters, and increase production cost.

SUMMARY OF THE INVENTION

It is an object of the present invention to provide a liquid crystal display with a wide viewing angle in simplified processing steps.

It is another object of the present invention to prevent the color filter damage, when fabricating a liquid crystal display.

These and other objects may be achieved by a liquid crystal display with the following features.

The liquid crystal display includes a first substrate, a second substrate facing the first substrate, a liquid crystal layer sandwiched between the first and the second substrates, and first and second electrodes formed at either the first substrate or the second substrate to apply an electric field to the liquid crystal layer. The liquid crystal layer has a barrier of polymer at each pixel region.

The first electrode may be formed on the first substrate, and the second electrode on the second substrate. The first electrode has an opening pattern at each pixel region, and the polymer barrier is positioned corresponding to the opening pattern.

The second substrate is provided with a color filter at each pixel region, and the color filter has a groove corresponding to the opening pattern of the pixel electrode.

A protrusion is formed on the opening pattern. Alternatively, a protrusion or a hollow may be formed under the opening pattern.

A first vertical alignment layer is formed on the first electrode, and a second vertical alignment layer on the second substrate.

The liquid crystal layer bears a negative dielectric anisotropy.

In a method of fabricating the liquid crystal display, the first and the second substrates are arranged to face each other. A liquid crystal is injected in-between the first and the second substrates to form a liquid crystal layer. A polymer barrier is formed at the liquid crystal layer.

The liquid crystal layer contains monomers having a property of transmitting phases when UV light is illuminated.

The method further includes the steps of forming a first electrode on the first substrate, and forming a second electrode on the second substrate. At least one of the first and the second electrodes has an opening pattern.

The method further includes the step of forming color filters either at the first substrate or at the second substrate such that each color filter has a groove corresponding to the opening pattern.

The UV light is illuminated to the monomers through the groove at the step of forming the polymer barrier.

The method further includes the step of forming a protrusion on the opening pattern, or forming a protrusion or a hollow under the opening pattern.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
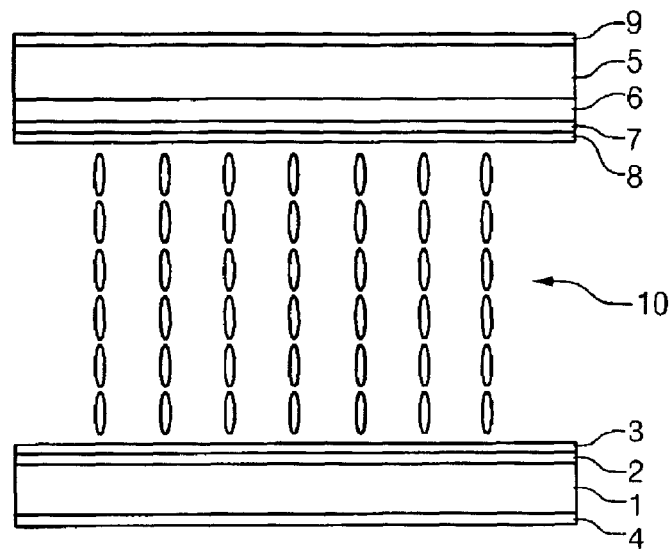
FIG. 1 is a schematic view of a usual liquid crystal display.

FIG. 1 is a schematic view of a usual liquid crystal display. As shown in FIG. 1, top and bottom substrates 1 and 5 are spaced apart from each other by a predetermined distance. Pixel electrodes 2 are internally formed at the bottom substrate 1, and color filters 6 and a common electrode 7 are internally formed at the top substrate 5. Vertical alignment layers 3 and 8 are formed on the electrodes 2 and 7, respectively. A liquid crystal layer 10 bearing negative dielectric anisotropy are disposed between the alignment layers 3 and 8. Polarizing plates 4 and 9 are externally attached to the respective substrates 1 and 5 to polarize the light entering and leaving the liquid crystal layer 10. The polarizing axes of the polarizing plate 4 attached to the bottom substrate 1 and the polarizing plate 9 attached to the top substrate 5 proceed at a right angle.

Figure 2:
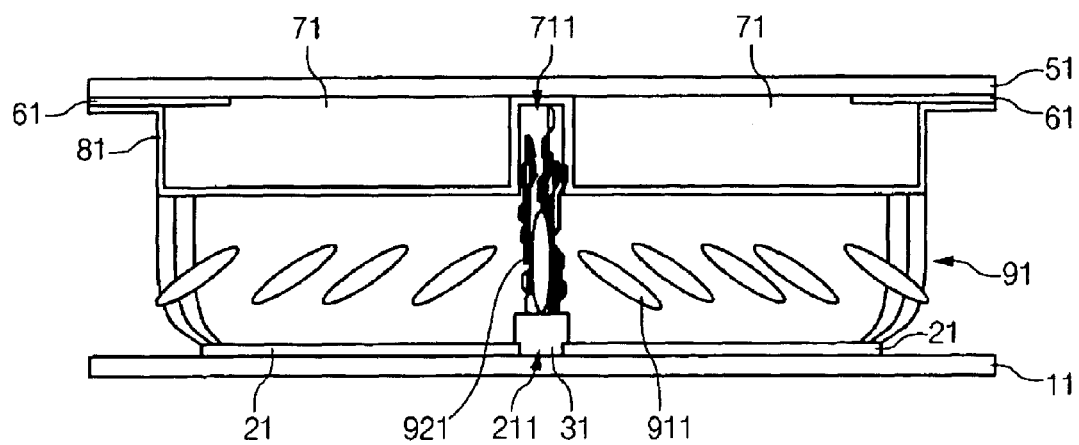
FIG. 2 is a cross sectional view of a liquid crystal display according to a preferred embodiment of the present invention.

FIG. 2 is a cross sectional view of a liquid crystal display according to a preferred embodiment of the present invention.

As shown in FIG. 2, a pixel electrode 21 is formed on a bottom substrate 11 with a thin film transistor (not shown) at each pixel region. An opening pattern 211 is formed at the pixel electrode 21, and a protrusion 31 is formed on the opening pattern 211 with silicon nitride or organic material.

A black matrix 61 is internally formed at a top substrate 51 with a metallic or opaque material to prevent leakage of light, and a color filter 71 is formed on the black matrix 61 at each pixel region such that it corresponds to the pixel electrode 21. The color filters 71 of R, G and B are arranged at the pixel regions in a sequential manner. Each color filter 71 has a groove 711 such that the latter corresponds to the opening pattern 211 of the pixel electrode 21. A common electrode 81 is formed on the black matrix 61 and the color filters 71 with a transparent conductive material. Vertical alignment layers (not shown) are formed on the common electrode 81 and the pixel electrodes 21, respectively.

A liquid crystal layer 91 bearing negative dielectric anisotropy is interposed between the substrates 11 and 51. The liquid crystal layer 91 contains monomers, and a polymer 921 is provided at the liquid crystal layer 91 between the opening pattern 211 of the pixel electrode 21 and the groove 711 of the color filter 71.

When voltage is applied to the substrates 21 and 81, an electric field perpendicular to the substrates 11 and 51 is formed at the pixel electrode 21, and a fringe field is formed at the edge portions of the pixel electrode 21 and the opening pattern 211. As the liquid crystal layer 91 bears negative dielectric anisotropy, the long axis of the liquid crystal molecule 911 is oriented perpendicular to the electric field. Accordingly, as shown in FIG. 2, the liquid crystal molecules 911 over the pixel electrode 21 are inclined toward the opening pattern 211 under the influence of the fringe field, whereas the liquid crystal molecules 911 over the opening pattern 211 are standing erect with respect to the substrates 21 and 51 without rotation while being fixed by the polymer 921.

The protrusion 31 formed on the opening pattern 211 makes it easy to align the liquid crystal molecules 911 as partitioned. Alternatively, a hollow may be formed under the opening pattern 211 instead of the protrusion 31. The protrusion or the hollow is dispensable, and hence, may be selectively used.

Figure 3:
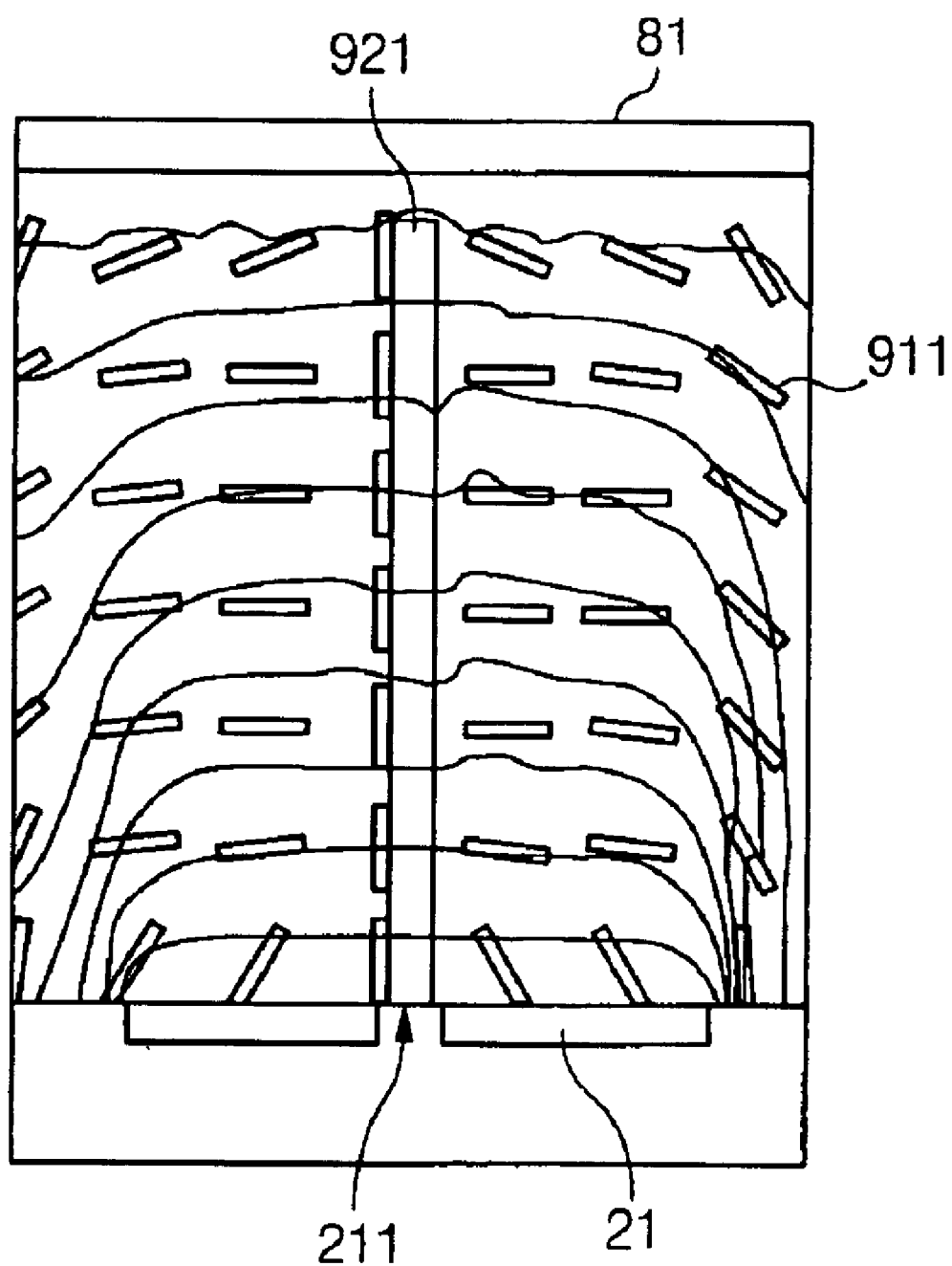
FIG. 3 illustrates the equipotential lines and the orientation state of liquid crystal molecules when applying voltage to the liquid crystal display shown in FIG. 2.

FIG. 3 illustrates the equipotential lines and the orientation state of the liquid crystal molecules when voltage is applied.

As shown in FIG. 3, when voltage is applied between the substrates, the liquid crystal molecules 911 over the pixel electrode 21 are arranged parallel to the substrates 11 and 51, but those close to the electrodes 21 and 81 are slightly inclined due to the orientation force of the vertical alignment layers. Closer to the edge of the pixel electrode 21 comes, more the liquid crystal molecules 911 become inclined toward the opening pattern 211. The liquid crystal molecules 911 over the opening pattern 211 are standing erect with respect to the substrates 11 and 51 without rotation while being fixed by the polymer 921.

In this way, the liquid crystal molecules can be aligned as partitioned in a stable manner. Furthermore, the liquid crystal molecules at the partitioning borderline area are standing erect with respect to the substrates by way of the polymer so that occurrence of abnormal texture can be prevented.

A method of fabricating the liquid crystal display will be now described with reference to FIGS. 4A, 4B, 5 and 6.

Figure 4A:
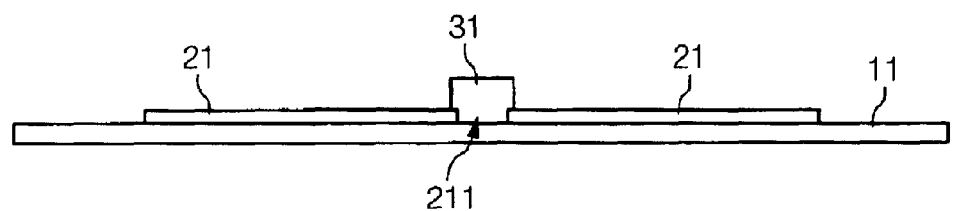
FIGS. 4A, 4B, 5 and 6 illustrate the steps of fabricating the liquid crystal display shown in FIG. 2.

As shown in FIG. 4A, a thin film transistor (not shown), and a pixel electrode 21 with an opening pattern 211 are formed on a first substrate 11 at each pixel region. A protrusion 31 is formed on the opening pattern 211 with an insulating material. Alternatively, the protrusion 31 may be formed under the opening pattern 211, or a hollow may be formed under the opening pattern 211 instead of the protrusion 31.

Figure 4B:
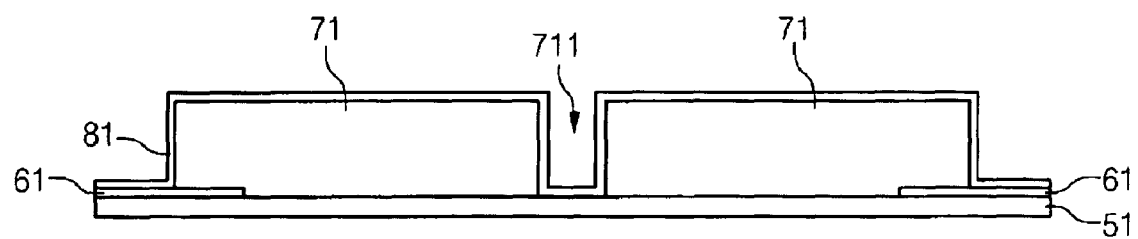

As shown in FIG. 4B, a black matrix 61 is formed on a second substrate 51 with a metallic or opaque material such as chrome, and a color filter 71 is formed on the black matrix 61 with a groove 711 at each pixel region. When the two substrates 11 and 51 are arranged to face each other, the groove 711 should correspond to the opening pattern 211 of the pixel electrode 21. A common electrode 81 is formed of a transparent conductive material on the black matrix 61 and the color filter 71.

Figure 5:
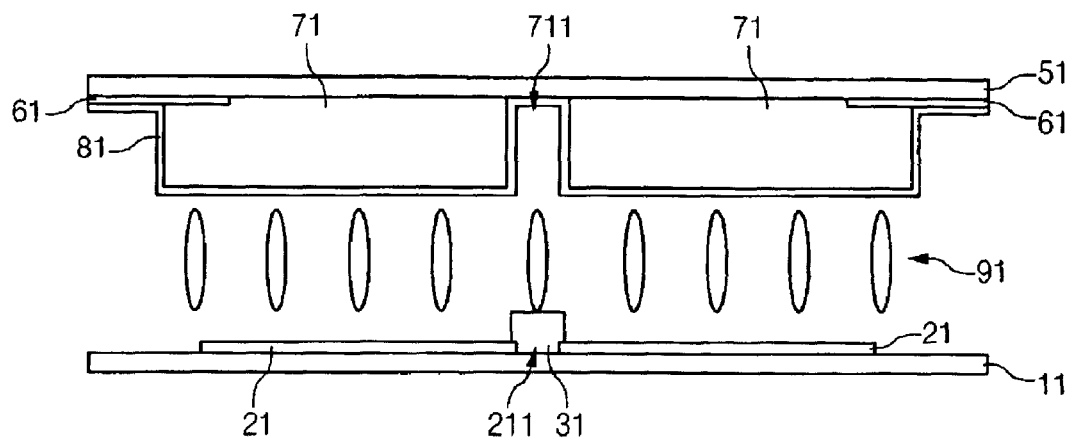

As shown in FIG. 5, the two substrates 11 and 51 are arranged to face each other, and a liquid crystal containing monomers is injected between the substrates 11 and 51 to form a liquid crystal layer 91. The monomers have a property of making phase transition under the illumination of ultraviolet (UV) light, and forming a polymer.

Figure 6:
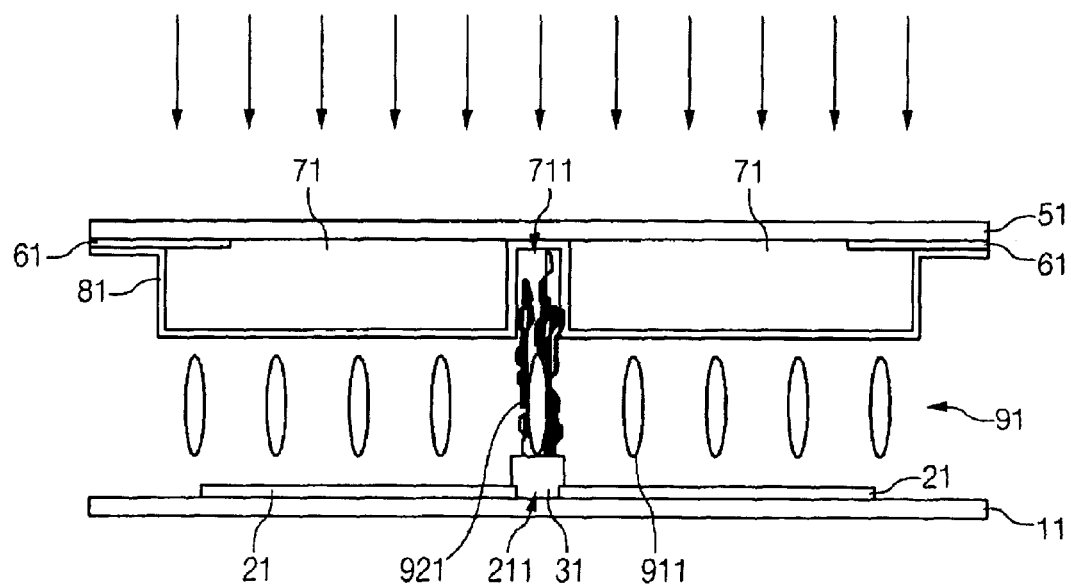

As shown in FIG. 6, the UV light is illuminated to the monomers from the top substrate 51. As the color filter 71 absorbs the UV light, the UV light passes only through the groove 711. Then, the monomers in the liquid crystal layer 91 are aggregated toward the opening pattern 211 due the UV light, and transit the phase to form a polymer 921 while leaving only small amount of monomers on the pixel electrode 21.

Accordingly, even when the voltage is applied, the liquid crystal molecules 911 at the area of the opening pattern 211 and the groove 711 are fixed by way of the polymer 921 to prevent abnormal textures.

As described above, in the inventive liquid crystal display, an opening pattern is formed at the pixel electrode, and a protrusion is formed on the opening pattern to obtain wide viewing angle without increasing the number of processing steps. Furthermore, a polymer is formed over the opening pattern to control the arrangement of the liquid crystal molecules, in order to prevent light leakage at the borderline area where the liquid crystal molecules are aligned in partitions. In this way, occurrence of abnormal texture can be prevented.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
   a first substrate;
   a first electrode formed on the first substrate;
   a second substrate facing the first substrate;
   a second electrode formed on the second substrate;
   a pixel region divided into a plurality of domains, each domain having a liquid crystal inclination direction different from each other;

a liquid crystal layer sandwiched between the first substrate and the second substrate; and a polymer region formed between the domains neighboring each other.

2. The liquid crystal display of claim 1, further comprising an opening pattern formed on the first electrode, wherein and the polymer region is arranged corresponding to the opening pattern.

3. The liquid crystal display of claim 2, further comprising:

a color filter formed on the second electrode; and a groove formed on the color filter, wherein the groove is arranged corresponding to the opening pattern of said first electrode.

4. The liquid crystal display of claim 2, wherein a protrusion is formed on the opening pattern.

5. The liquid crystal display of claim 2, wherein a protrusion or a hollow is formed under the opening pattern.

6. The liquid crystal display of claim 2, further comprising:

a first vertical alignment layer formed on the first electrode; and a second vertical alignment layer formed on the second substrate.

7. The liquid crystal display of claim 1, wherein the liquid crystal layer has a negative dielectric anisotropy.

8. A method for fabricating a liquid crystal display, comprising steps of:

arranging a first substrate and a second substrate such that the first substrate and the second substrate face each other;

filling liquid crystal between the first substrate and the second substrate to form a liquid crystal layer; and forming a pixel region, the pixel region divided into a plurality of domains, each domain has a liquid crystal inclination direction different from each other; and forming a polymer region between the domain neighboring each other.

9. The method of claim 8, wherein the liquid crystal contains monomers having a phase transit property when light is illuminated.

10. The method of claim 8, further comprising steps of:

forming a first electrode on the first substrate;

forming a second electrode on the second substrate; and forming an opening pattern on at least one of the first electrode and the second electrode.

11. The method of claim 10, further comprising a step of forming color filters either on the first substrate or on the second substrate, each color filter having a groove arranged corresponding to the opening pattern.

12. The method of claim 11, wherein the step of forming the polymer region comprises a step of illuminating a UV light to the monomers through the groove.

13. The method of claim 10, further comprising a step of forming a protrusion on the opening pattern.

14. The method of claim 10, further comprising a step of forming a protrusion or a hollow under the opening pattern.

15. The method of claim 8, wherein the liquid crystal layer has a negative dielectric anisotropy.

16. A liquid crystal display, comprising:

a first substrate;

a first electrode formed on the first substrate;

a second substrate facing the first substrate;

a second electrode formed on the second substrate and facing the first electrode;

a liquid crystal layer containing liquid crystal molecules and formed between the first substrate and the second substrate;

a pixel region divided into a plurality of domains, each domain having a liquid crystal inclination direction different from each other; and a polymer region formed between the domains neighboring each other, the polymer region preventing the liquid crystal molecules from rotating when an electric field is formed between the first electrode and the second electrode.

17. The liquid crystal display of claim 16, further comprising an opening pattern formed on the first electrode, wherein the polymer region is formed corresponding to the opening pattern.

18. The liquid crystal display of claim 17, further comprising a protrusion formed on the opening pattern.

19. The liquid crystal display of claim 17, further comprising a groove formed on the second electrode, wherein the second electrode arranged corresponding to the opening pattern.

20. The liquid crystal display of claim 17, wherein the liquid crystal has a negative dielectric anisotropy.

* * * * *